United States Patent [19]

Damkjaer

[11] Patent Number: 5,000,312

[45] Date of Patent: Mar. 19, 1991

[54] CHAIN LINK AND ASSOCIATED LOCKING DOWEL

[75] Inventor: Poul E. Damkjaer, Markvangen, Denmark

[73] Assignee: Maskinfabrikken Baeltix A/S, Vejle Ost, Denmark

[21] Appl. No.: 341,796

[22] Filed: Apr. 21, 1989

[30] Foreign Application Priority Data

Apr. 21, 1988 [DK] Denmark ............................. 2184/88

[51] Int. Cl.$^5$ ............................................ B65G 17/38
[52] U.S. Cl. ..................................... 198/853; 474/224
[58] Field of Search ............... 198/851, 853; 403/294, 403/381; 59/4, 5, 7; 305/58 R; 474/156, 157, 206, 212, 224, 228, 235

[56] References Cited

U.S. PATENT DOCUMENTS

| | | | |
|---|---|---|---|
| 2,852,129 | 9/1958 | Conner | 198/853 |
| 3,726,569 | 4/1973 | Magno et al. | 198/853 X |
| 4,006,817 | 2/1977 | Paul | 198/853 |
| 4,080,842 | 3/1978 | Lapeyre et al. | 198/853 X |
| 4,150,856 | 4/1979 | Hakkenberg et al. | 305/58 R X |
| 4,557,374 | 12/1985 | Bode | 198/852 |
| 4,632,589 | 12/1986 | Hsiu | 403/294 X |
| 4,709,807 | 12/1987 | Poerink | 198/853 |
| 4,832,187 | 5/1989 | Lapeyre | 198/853 X |

FOREIGN PATENT DOCUMENTS

| | | | |
|---|---|---|---|
| 0254604 | 1/1988 | European Pat. Off. | 198/853 |
| 2089475 | 6/1982 | United Kingdom | 403/294 |

*Primary Examiner*—H. Grant Skaggs
*Assistant Examiner*—D. Glenn Dayoan
*Attorney, Agent, or Firm*—Antonelli, Terry, Stout & Kraus

[57] ABSTRACT

Chain links for chain link conveyors wherein plastic locking dowels are inserted into undercut grooves in the edge of the chain link for preventing pivots in the chain link chains from being axially displaced. In parallel-running chains with common pivots extending across an entire width of a track, to prevent the chain links from sliding away from each other, the locking dowels are inserted into notches in the sides of the chain links which face toward an adjacent chain, with the dowels holding the chain links together at a predetermined defined distance. A mounting and disassembly of the chains and chain tracks can be carried out in a simple manner without the need for special tools, and the entire assembly can be fully automatic.

12 Claims, 3 Drawing Sheets

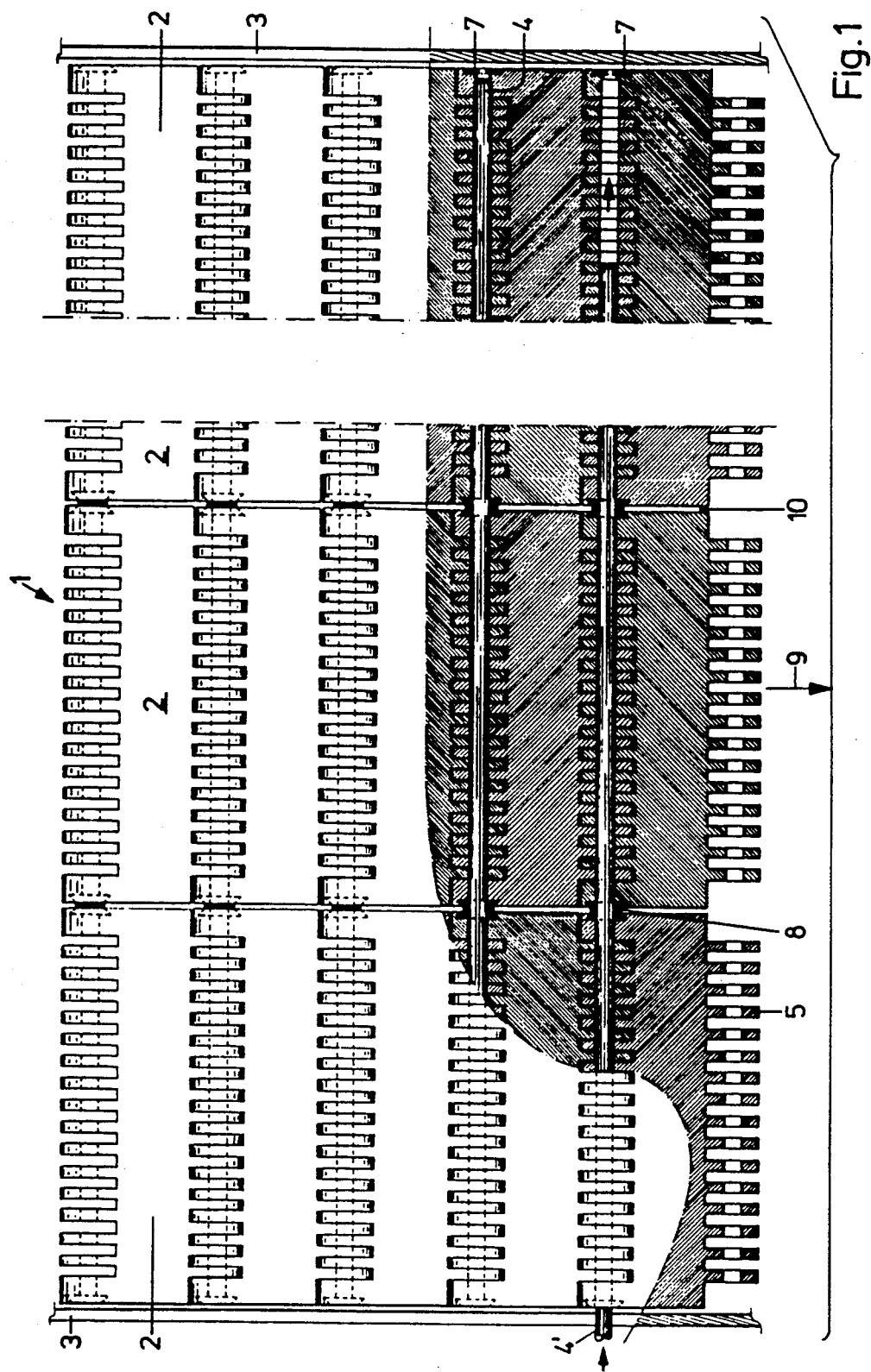

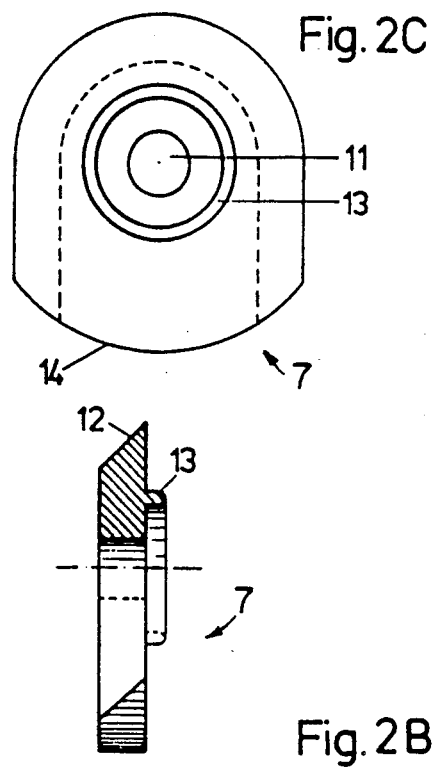
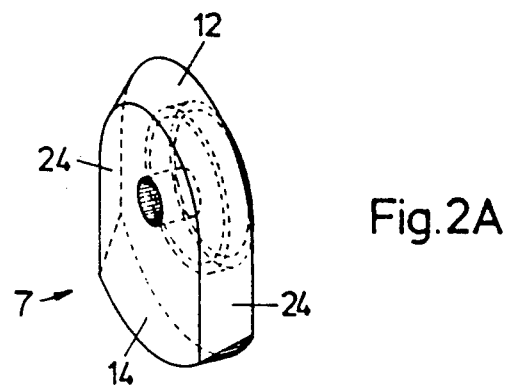
Fig. 2C
Fig. 2A
Fig. 2B
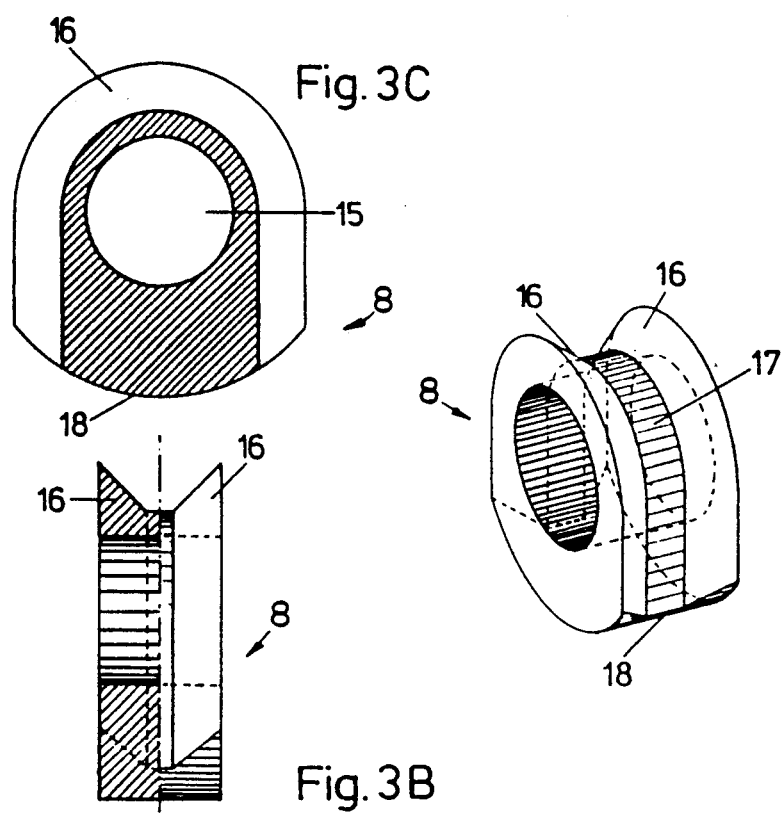
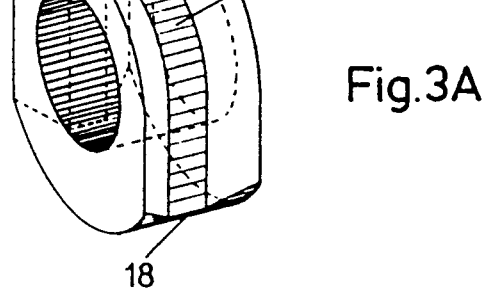
Fig. 3C
Fig. 3A
Fig. 3B

CHAIN LINK AND ASSOCIATED LOCKING DOWEL

BACKGROUND OF THE INVENTION

This invention relates to chain links and, more particularly to chain link conveyors formed of a plurality of chain links assembled by pivot means so that adjacent chain links can turn in a hinge like manner around the pivot means holding them together, with means being provided for positionably securing the pivot means.

Chain links of the aforementioned type are normally produced of plastic by injection moulding, with each link being moulded as a one-piece unit which, either with steel or plastic pivot rods, is assembled to form an endless chain link conveyor, drawn by one or more driving wheels.

Since chain links of the aforementioned kind are only a few centimeters in length, e.g. in the range of 5–15 cm, in the production of a conveyor, a large number of chain links are assembled by pivot rods or similar assembly elements.

In, for example, U.S. Pat. No. 4,080,842 is known a two-part pivot for use in the assembly of chain links for chain link conveyors is proposed, wherein each pivot part has a head at the one end and an inclined section with locking ridges at the other end. The pivot parts are assembled by forcing the locking ridges into engagement with each other, and the result is a substantially permanent assembly, in that the pivot is normally ruined upon separation. This principle can be used only with soft plastic pivots which can be deformed slightly during the assembly operation. Moreover, as the chain links are gradually worn and the pivot is given greater and greater clearance, the pivots are inclined to separate from each other at the joint.

It is also generally known to use plastic pivots which, after the assembly, are deformed by heating in the formation of a head. The pivot thus sits permanently in the chain and must be ruined for disassembly. This construction makes disassembly difficult and requires special tools for heating when assembling the pivots in the chain links.

With the use of steel pivots for the assembly of chain links for chain link conveyors, the normal pivot locking mechanisms may be utilized, e.g. an annular groove in each end of the pivot in which a locking element such as a circlip can be secured. However, such constructions considerably increase the cost of the chain link conveyor, with the reason being that the pivots are usually made of hard steel which is difficult and expensive to machine, and the assembly and disassembly require special tools.

The object of the present invention is to provide a chain link which is arranged in such a manner that the assembly and disassembly of pivots, regardless of which material the pivots are made, is to a wide extent simplified and made cheaper, in that completely smooth pivots can be used.

In accordance with advantageous features of the present invention, a chain link is provided wherein a groove is provided in each side of each chain link opposite at least one of the pivot bores of the chain link, with the groove being adapted to receive and securably hold a locking dowel arranged so as to restrict a displacement of the pivot in an axial direction.

In accordance with the present invention, the locking grooves and the chain links are formed at the same time that the chain link is injection molded, and the locking dowels for restricting the displacement can be similarly injection molded, for example, of the same plastic material as the chain link, or possibly of a slightly softer plastic material. Moreover, the pivots used in this construction are completely smooth and do not require any finishing work in the form of grooves, holes, or the like, thereby considerably reducing the cost thereof, which is particularly significant, in the case of steel pivots.

By virtue of the very simple construction of the locking dowels in accordance with the present invention, a simple assembly and disassembly is realized without the use of any special tools and, consequently, it is possible for the operation to be fully automated so that the assembly of chain links for a chain or chain track can be carried out in a fully automatic matter by a relatively inexpensive assembly machine.

Presently, both assembly and disassembly of chain link conveyors is carried out manually and it is a considerable advantage that the chain links can be disassembled, for example, when replacing worn or defective links in a chain, completely without the use of special tools thereby enabling the repair to be effective on sight.

In order to disassemble a chain link constructed in accordance with the present invention, all that is necessary is the removal of the locking dowels at one side of the link or links which are to be replaced and the pulling or pushing out of the pivots. The assembly of the chain is carried out merely by inserting the pivots, after which the locking dowels are inserted so that the pivots are once again positionwise secured.

This assembly and dismantling principle can be used on many types of chain link conveyors comprising identical chain links with pivots, but has been developed mainly for those which run in a straight-out manner and which have steel or plastic pivots.

In order to ensure that the locking dowel always sits in a sufficiently firm manner, even though the chain is exposed to great mechanical influences in the form of vibrations, jolting etc., e.g. from the goods which are loaded on the conveyor the groove is undercut, for example, into a dove-tail groove, which is not through-going from edge to edge, and the locking dowel has a cross-sectional profile corresponding to the groove profile. The groove includes means, such as, for example, a snap-edge means or collar means on a side facing the chain link, with such means being arranged to engage the pivot bore. With such an arrangement, the locking dowel can still be inserted and removed completely without the use of special tools.

Chain link conveyors of the type described above are often in the form of a number of parallel-running chains which make up broad conveyor tracks, often in such a manner that the pivots in the chain links extend throughout the whole of the breadth. For reasons of production tolerances, stretching of the chain under great loads etc., there is a possibility of transverse movement of the chain links, the result being that unacceptable longitudinal slots arise in the conveyor track.

Chain link tracks of the aforementioned type may be arranged to be coupled together with at least one adjacent change in the formation of a conveyor chain track with the adjacent chain link in each chain being assembled by pivot means which are throughgoing for an entire width of the chain track so that the chain links may be turned in a hinge-like manner around the pivot means which holds them together, with means being provided for positionwise securing of the pivot means. Chain link tracks of this type are generally selected to solve certain conveying tasks.

In a chain link track of the aforementioned type, at least the chain link sides which face towards an adjacent chain and opposite the pivot bores of the chain links, a groove is provided in which the locking dowel can be inserted before insertion of the pivot, with the locking dowel having a central bore for the pivot and being arranged for simultaneous engagement with the grooves in two chain links which abut each other on the same pivot thereby coupling these chain links together. By using such a locking dowel, the chain links lying adjacent to each other are locked together and thus any relative transverse displacement between the chain links is impossible. However, this arrangement has no effect on the simple assembly and disassembly afforded by the present invention in that the locking dowels have a throughgoing bore for the pivots so that, during assembly, the locking dowels are merely inserted prior to insertion of the pivot means and, for disassembly, the pivot means is removed first after which the locking dowels can easily be removed. A chain assembly with such locking dowels can also be fully automated.

When such together-locking dowels are mounted, they sit solidly secured by the pivot, and therefore under no circumstances can they be lost or loosened during operation.

The groove of the present invention is undercut in the form of, for example, a dove-tail groove which is not throughgoing from edge to edge, with the locking dowel having a cross-sectional profile corresponding to the cross-sectional profile of two abutting grooves thereby resulting in a construction which holds the chain links together, even in the event of very great forces in the transverse direction, e.g. forces which arise when the conveyor track is being sluiced under high pressure and the sluicing pressure is applied directly against the slot between the tracks.

In accordance with the present invention, an undercut groove is provided in each side and arranged so as to be assembled into chain tracks with through-going pivot means while using both locking dowels for positionally securing the pivot means and locking dowels for coupling together the chain links on the same pivot means, whereby the same chain link can be used in the formation of tracks of any desired breadth, and both locking dowels for positionwise securing of the pivots and locking dowels for the locking together of adjacently-lying chain parts can be used, also in the same chain conveyor.

Although the invention described above can be used in connection with many types of chain link, it has proved particularly advantageous for the chain link having a smooth or perforated support surface, from each side of which extend rows of traction or hinge eyes with through-going bores. The eyes on one side of the link are staggered in relationship to the eyes on the other side of the link and, the underside of the link comprises longitudinal, inclined ribs which are an integral part of the support surface and the eyes on both sides thereof. The ribs extend in pairs toward each other in the running direction and towards a rounded transverse rib piece which constitutes a point of engagement for a driving sprocket. Such chain links have low friction against the track on which they slide. The chain links can be produced with low weight and yet still with sufficient strength, the reason being that longitudinal traction forces in the chain are transferred from pivot to pivot by the ribs which extend from pivot to pivot, and the use of supporting cross-ribs between the hinge parts is avoided.

The ribs extending pair-wise towards the chainwheel's point of engagement automatically center the chain/the chains on the driving gears.

Advantageously, according to the present invention, the outer traction eyes in each side of each chain link are of a greater thickness than the remainder and each have an undercut groove which is configured in such a manner that it is not throughgoing to the upper side of the chain link but is throughgoing to the underside of the chain link and arranged for insertion of locking dowels from the underside whereby a top side of the conveyor from which the tracks for the locking dowels is not visible or accessible, and thus no places arise at which dirt can collect. Both the assembly and the disassembly is carried out from underneath by the insertion and removal of locking pivots.

The locking dowels in accordance with the present invention are adapted to be inserted in an undercut groove and a chain link for closing a pivot bore in the chain link, with the locking dowel being configured as a plate item with a rounded or tapered portion and two substantially straight side flanks which extend from the straight portion, all substantially with the same cross-sectional profile as that of the groove in which the dowel can be inserted. Means are provided for the positionalwise securing of the dowel opposite the pivot bore with a smaller diameter than the pivot journal is provided and disposed opposite the position of the journal of the pivot.

Moreover, a locking dowel may be provided for insertion into undercut grooves in chain links which, on a common pivot, abut against each other, with the locking dowel being configured as a one-piece unit by two side portions which are symmetrical about a plane at right angles to a throughgoing hole with at least the same diameter as the pivot, with each side portion having the same cross-sectional profile as a groove.

Moreover, in accordance with the present invention, the locking dowel between the side portions may be provided with a substantially cylindrical area which wholly or partly surrounds the bore.

By virtue of the above-noted features of the locking dowels constructed in accordance with the present invention, locking dowels are realized which are simple and easy to mount in that one can directly see on the dowels which end must be turned forwards for assembly. The locking dowels may also be configured rotationally symmetrical; however, by configuring the dowels in the manner described above, the track or groove is completely filled out and forms a smooth transition for the chain link so that dirt collecting corners can be avoided.

Moreover, by providing a substantially cylindrical area which wholly or partly surrounds the bore between the side portions, a well-defined slot results between.

The configuration of the chain links as characterized in claim 10 results in a well-defined slot between parallel-running chains, and thus it is ensured that the slot is so broad that it can be cleaned by sluicing, e.g. high-pressure sluicing. It is namely from the point of view of cleaning that it is undesirable that the chain links in parallel-running chains abut completely together, in that the crack which arises herewith can not be adequately cleaned.

BRIEF DESCRIPTION OF THE DRAWINGS

The invention will now be described in more detail with reference to the drawing, which shows a preferred embodiment, wherein:

FIG. 1 is a top partial cross-sectional view of a section of a chain conveyor constructed in accordance with the present invention;

FIG. 2A is a perspective view, on an enlarged scale, of a locking dowel constructed in accordance with the present invention;

FIG. 2B is a cross-sectional view of the locking dowel of FIG. 2A;

FIG. 2C is a plan view of the locking dowel of FIG. 2A;

FIG. 3A is a perspective view, on an enlarged scale, of another locking dowel constructed in accordance with the present invention for locking together chain links running at the side of each other;

FIG. 3B is a partial cross-sectional view of the locking dowel of FIG. 3A;

FIG. 3C is another cross-sectional view of the locking dowel of FIG. 3A;

DETAILED DESCRIPTION

Figure 4:
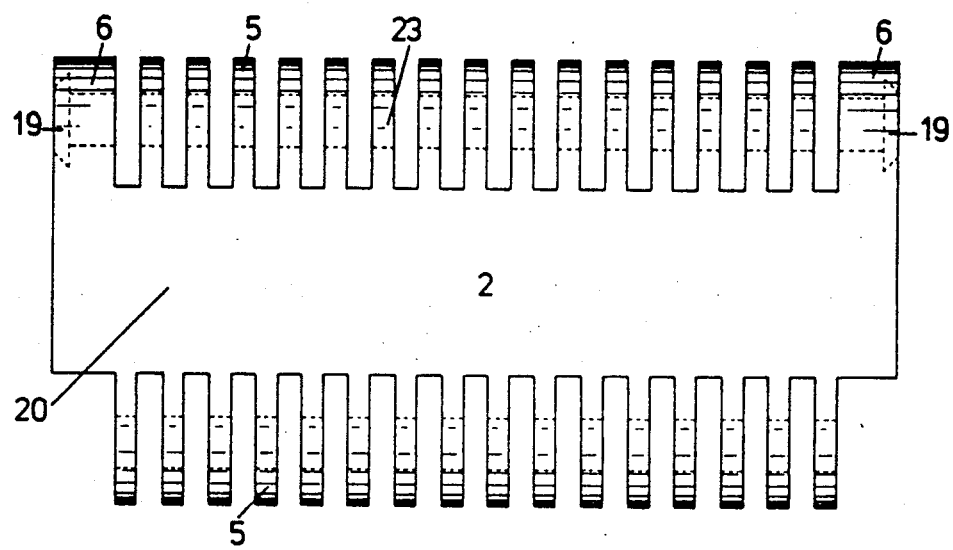
FIG. 4 is a top plan view of a chain link constructed in accordance with the present invention.

Referring now to the drawings wherein like reference numerals are used throughout the various views to designate like parts and, more particularly, to FIG. 1, according to this Figure, a chain link track generally designated by the reference numeral 1 is composed of a number of parallel conveyor chains built up with identical chain links 2, where the chains are assembled by through-going pivots 4 transversely of a longitudinal direction of the track 1. On each side of the chain track 1 is shown a track-limiting element 3 which can be of any known type. The track 1 is arranged to be driven in the direction of the arrow 9 by normal sprocket wheels (not shown).

Figure 5:
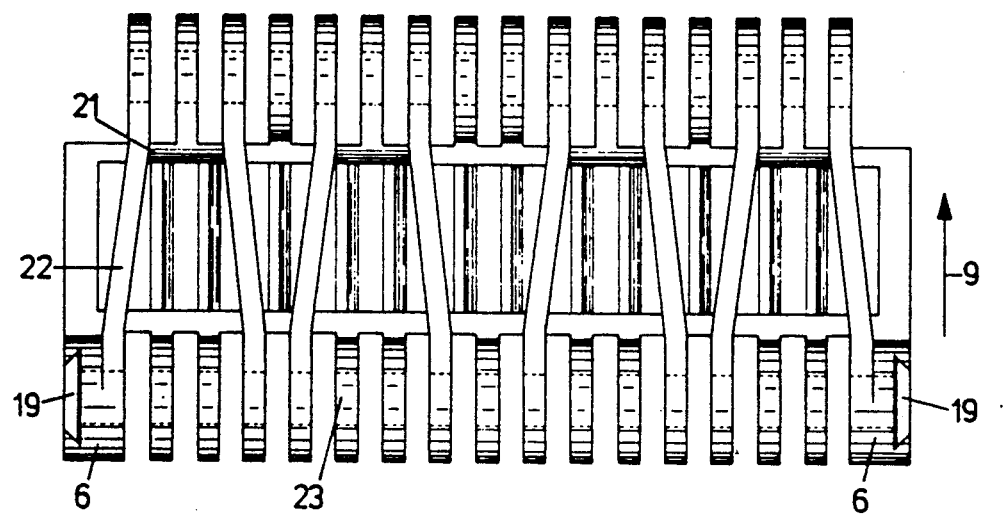
FIG. 5 is a bottom plan view of the chain link of FIG. 4.
Figure 6:
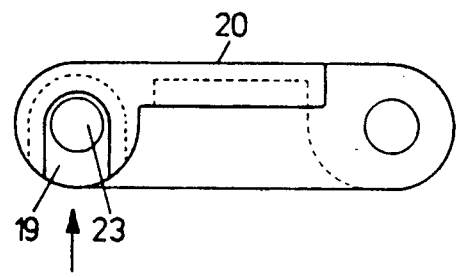
FIG. 6 is an end view of the chain link of FIGS. 4 and 5.

The chain links 2 are shown in more detail and on a larger scale in FIGS. 4-6, where each link comprises a supporting surface 20 which, in the drawing, is shown completely smooth and unbroken, but which can be configured in other ways in accordance with requirements, e.g. with slots or holes for the draining off of liquids or particles, for instance from the product which is being conveyed on the track. The slot or the holes can also be provided in the supporting surface 20 in order to reduce the weight of the chain links or with the object of saving material. The chain link is normally plastic, injection moulded as a unit and with inclined ribs 22 on the underside as shown in FIG. 5. These ribs 22 extend in pairs towards each other in the driving direction 9 and towards a rounded transverse rib piece 21 which constitues the point of engagement for a chainwheel.

In each of the long sides, the chain link 2 has a number of traction eyes 5, 6 with through-going bores 23 for a pivot. Some of the eyes form an integral part of the ribs 22, so that the traction force is transferred directly from pivot to pivot, and thus the supporting surface 20 is not required to transfer traction forces. The chain link 2 is thus divided into a part which transfers traction forces in the chain link 2, and a part which bears the weight of the goods being conveyed on the chain link 2. It is hereby possible to avoid transverse ribs on the underside of the chain link 2.

In the one long side, the outer eyes 6 are thicker than the remaining eyes, and in these eyes 6 are formed grooves or notches 19, e.g. as shown with undercut notches with trapezoidal cross-sectional profile, see especially FIGS. 4-6. In these notches can be inserted the locking dowels generally designated by the reference numerals 7 and 8 which are shown in more detail and on a larger scale in FIGS. 2 and 3, so that the locking dowels 7 (see FIG. 1) restrict the displacement of the pivot 4 in the axial direction, and such that the locking dowels 8 (see FIG. 1) couple chain links on the same pivot together at a well-defined distance, so that a predetermined slot 10 arises between the two parallel chains.

The locking dowel 7 is provided with a small through-going bore 11 so that a tool, e.g. a mandrel, can be introduced in order to press a pivot out of the chain link. The collar 13 is arranged to engage with the bore 23 in the chain link, and thus the locking dowel 7 sits firmly in position when inserted in the notch 19 in a chain link. Moreover, the locking dowel 7 is configured with a rounded top 12 with inclined edge, two side flanks 24 with inclined edge and a rounded bottom edge 14, and with substantially the same rounding and profile as that of the rounding and profile of the eyes 6 of the chain link 2. The shape of the locking dowel 7 is thus one which makes it simple to insert and it cannot be turned incorrectly. This locking dowel 7 is arranged to prevent the pivot 4 from being displaced in the axial direction in the chain link, see FIG. 1.

The locking dowel 8 has a through-going bore 15 with at least the same diameter as a pivot 4, a cylindrical area 17 which determines the size of the slot 10 (see FIG. 1) between the chains, and two symmetrical side portions 16 with a common rounded bottom area 18 which corresponds to the outer profile of the chain link eyes 6. The locking dowel 8 is symmetrical, and its shape ensures that it cannot be turned the wrong way during the insertion. This locking dowel 8 is arranged for holding together adjacent chain links on the same pivot, so that the chain links always lie at a fixed and well-defined distance from each other.

With reference to FIG. 1 of the drawing, it will now be explained how the locking dowels 7 and 8 are used. In FIG. 1 is seen a pivot 4 during insertion. The locking dowels 8 are mounted in place before the pivot 4 is inserted. The pivot 4 thus secures all the dowels 8 between the chain links. The locking dowel 7 is snapped into place in the outer-lying notches when the pivot 4 has been inserted. As shown at the right in FIG. 1, it is possible to insert the one locking dowel 7 before the insertion of the pivot 4. Through the small bores 11 in the outer locking dowels 7, it can be ascertained whether the pivot 4 is inserted correctly and is of sufficient length.

In FIG. 6, an arrow shows the direction in which the locking dowels 7 and 8 are inserted in the notch 19, which is preferably configured from the underside and does not extend to the upperside 20 of the chain links.

It will be obvious to those familiar with the art that the above-described locking dowels 7, 8 for positionwise restriction of a chain pivot and for the coupling together of chain links on the same pivot 4 will be able to be executed in connection with almost any type of chain, and under application of locking dowels of configurations other than those which have been shown, without deviating from the basic spirit of the invention.

Chain conveyors of the kind described above are produced for certain applications in widths up to 7–8 m. In tracks of such widths, it is not necessary to use entirely through-going pivots. A number of shorter pivots in extension of each other may be used, whereby the assembly work is simplified, among other things because the pivot parts can be inserted from each their sides. Moreover, if plastic pivots are involved, the divided pivots provide the possibility of simplified production, in that pivots can be injection moulded in lengths of 0.5–1.5 m. However, the use of pivots in sections in extension of each other does not alter the principles of the invention.

I claim:

1. A chain link adapted to be assembled with additional chain links to form an endless conveyor chain by pivot means so that adjacent chain links can turn in a hinge like manner around the pivot means, the chain link comprising bore means provided at a forward and rearward portion of said chain link and extending transversely of the chain link for accommodating said pivot means, an undercut groove means provided in each side of the chain link at a position opposite respective ends of at least one of said bore means for securely receiving a locking dowel restricting a displacement of the pivot means in an axial direction, and wherein the groove means has a cross-sectional profile corresponding to a cross-sectional profile of the locking dowel and comprises means on a side facing the chain link for engagement with said chain link.

2. A chain link adapted to be assembled with additional chain links to form an endless conveyor chain arranged to be coupled together with at least one laterally adjacent corresponding conveyor chain to form a conveyor chain track with adjacent chain links in each conveyor chain track being assembled by pivot means extending across an entire width of the conveyor chain track, the chain link comprising a groove means provided at least on a side of the chain link facing an adjacent chain link in the conveyor chain track having a corresponding groove means for receiving a locking dowel before an insertion of the pivot means simultaneously engaging with the groove means in the adjacent chain links on the same pivot means to couple the adjacent chain links together.

3. A chain link according to claim 2, wherein the groove means is undercut, and wherein a cross-sectional profile of the groove means in adjacent chain links corresponds to a cross-sectional profile of the locking dowel.

4. A chain link according to one of claims 1 or 3, wherein a groove means is provided in each side of each chain link adapted to be assembled into the conveyor chain track, said groove means being adapted to receive said locking dowel for the positional securing of the pivot means and an additional locking dowel for coupling chain links on the same pivot means together.

5. A chain link according to one of claims 1, 2 or 3, wherein the chain links comprise at least one of a smooth and perforated surface, rows of traction eye means for forming said bore means, wherein the eye means on the forward side of the chain link are staggered in relation to the eye means on the rearward side of the chain link, and wherein longitudinally extending rib means forming an integral part of the support surface and the eye means on both sides of the chain link are provided on an underside of the chain link, the rib means extending in pairs toward each other in a running direction of the conveyor and towards a rounded transverse rib means forming a point of engagement for a driving sprocket.

6. A chain link according to claim 5, wherein the traction eye means at respective sides of the chain link are of a greater thickness than the remaining traction eye means and have an undercut groove means configured in such a way so as to enable an insertion of the locking dowel from the underside of the chain link.

7. A chain link according to one of claims 1 or 3, wherein the groove means is formed as a dove-tail groove.

8. A locking dowel adapted to be inserted in an undercut groove means in a chain link for closing a pivot bore means of the chain link, the locking dowel comprising a plate portion provided with at least one of a rounded or tapered portion and two substantially straight side flanks extending from said tapered or rounded portion, said tapered or rounded portion and said side flanks having the same cross-sectional profile as a cross-sectional profile of the groove means, collar means provided on said plate portion engageable with the pivot bore means for enabling a positional securing of the locking dowel opposite the pivot bore means, and a through-going bore means having a diameter smaller than a diameter of a journal means of the pivot means and disposed in opposition to the journal means.

9. A locking dowel adapted to be inserted into undercut groove means in chain links which abut against each other on a common pivot means, the locking dowel being constructed as a one-piece unit comprising a through-hole having a diameter substantially equal to a diameter of the pivot means, two side portions symmetrical about a plane disposed at right angles to the through hole corresponding to a cross-sectional profile of the groove means.

10. A locking dowel according to claim 9, characterized in that between the side portion 16 wherein a substantially cylindrical area is provided between said side portions which at least partly surrounds the through hole.

11. A locking dowel according to claim 10, wherein said substantially cylindrical area completely surrounds the through hole.

12. A chain link adapted to be assembled with additional chain links to form an endless conveyor chain by pivot means, the chain link comprising bore means provided at a forward and rearward portion of said chain link and extending transversely of the chain link for accommodating said pivot means, and wherein groove means are provided in each side of the chain link in a position opposite respective ends of at least one of said bore means for securely receiving a locking dowel and restricting a displacement of said pivot means in an axial direction, and wherein the groove means is formed as a dove-tail groove.

* * * * *